United States Patent [19]

Stoneburner

[11] 4,135,197

[45] Jan. 16, 1979

[54] VIBRATION DAMPING MEANS FOR INK JET PRINTING DEVICE

[75] Inventor: Leonard G. Stoneburner, Fairborn, Ohio

[73] Assignee: The Mead Corporation, Dayton, Ohio

[21] Appl. No.: 842,300

[22] Filed: Oct. 14, 1977

[51] Int. Cl.[2] .............................................. G01D 15/18

[52] U.S. Cl. ........................................................ 346/75

[58] Field of Search ........................................... 346/75

[56] References Cited

U.S. PATENT DOCUMENTS 3,739,393 6/1973 Lyon ................................ 346/75 X 3,882,508 5/1975 Stoneburner ......................... 346/75

*Primary Examiner*—Joseph W. Hartary

*Attorney, Agent, or Firm*—Biebel, French & Nauman

[57] ABSTRACT

In an ink jet printing device a vibration damping means is provided in the printing head, which comprises an adjustably positionable rigid contact member that engages the surface of the orifice plate at a position remote from the vibration stimulation means that produces high frequency traveling wave vibration longitudinally in the orifice plate. The rigid contact member is preferably resiliently urged into contact with the surface of the orifice plate and is in point contact therewith at a position equidistant from the side edges of the orifice plate.

6 Claims, 3 Drawing Figures

VIBRATION DAMPING MEANS FOR INK JET PRINTING DEVICE

BACKGROUND OF THE INVENTION

1. Field of the Invention

The present invention relates to ink jet printing devices, and more particularly, to a vibration damping mechanism associated with the orifice plate in the printing head in which traveling waves are used to generate uniform filaments and droplets from the orifices.

2. Prior Art

In an ink jet printing device of the general type to which the present invention relates, it is common to use some means of substantially reducing, if not eliminating, reflected wave propogation through the orifice plate when it is stimulated at high frequency so as to vibrate along its length. For example, the device disclosed in Lyon et al U.S. Pat. No. 3,739,393 utilizes a traveling wave stimulation technique and in order to dampen out interferring reflected waves polyurethane or other similar material is placed in contact with the end portions of the orifice plate in order to dampen out vibrations remote from the point of contact of the mechanical stimulator. Such devices, although they are fairly efficient in damping out reflected waves at the ends of the orifice plate, suffer from several deficiencies.

One difficulty associated with the use of such plastic or rubber like bumpers is that since they are contained within the ink reservoir above the orifice plate they produce a source of contamination for the ink supply which results in small particles becoming lodged in the extremely small orifices, thus clogging the orifices. In addition, it is believed that a significant boundary effect occurs at the leading edge of the tapered dampers in the case where such dampers are poured in position as is disclosed in the Lyon et al patent. These boundary effects result in generation of interfering waves which propagate along the orifice plate and are detrimental to propagation of the main wave being generated.

Further, the wedge of material in each end of the orifice plate assembly is intended to provide a gradual change in characteristic impedence of the orifice plate while simultaneously adding a high damping component. However, as a practical matter, the dampers are less effective than is desirable due to the impedence mismatch between the orifice plate and the polyurethane dampers.

SUMMARY OF THE INVENTION

The present invention overcomes the above described difficulties and disadvantages associated with such prior art damping devices by providing a completely different means of damping out reflected interfering waves in an orifice plate adjacent an end portion of the orifice plate remote from the point at which main wave propagation is induced. This is accomplished by providing a damping member disposed remote from the stimulation means and having an adjustably positionable rigid contact member in engagement with the surface of the orifice plate for engaging the orifice plate at a position such that reflected vibrations from an end of the orifice plate will be substantially damped.

It is preferable that the rigid contact member have point contact with the orifice plate at a position equidistant from the side edges of the orifice plate. In addition, it is also preferable to have the rigid contact member urged into engagement with the surface of the orifice plate by a resilient member which will maintain contact between the point of the rigid member and the orifice plate during vibration thereof.

Since positioning of the point along the surface of the orifice plate is critical, the rigid contact member is adjustably positionable longitudinally along an elongated orifice plate in the direction of propagation of the main wave so that the point can be positioned at an antinode of the main wave being generated. It is believed that this results in the generation of interfering waves 180 degrees out of phase with the waves being reflected from the end portions of the orifice plate and thus essentially cancels out those reflected waves. In any event, the adjustability of the position of contact is necessary where the frequency of stimulation can be varied since the position of the antinodes of the main wave will vary at various frequencies.

DETAILED DESCRIPTION OF THE PREFERRED EMBODIMENT

Figure 1:
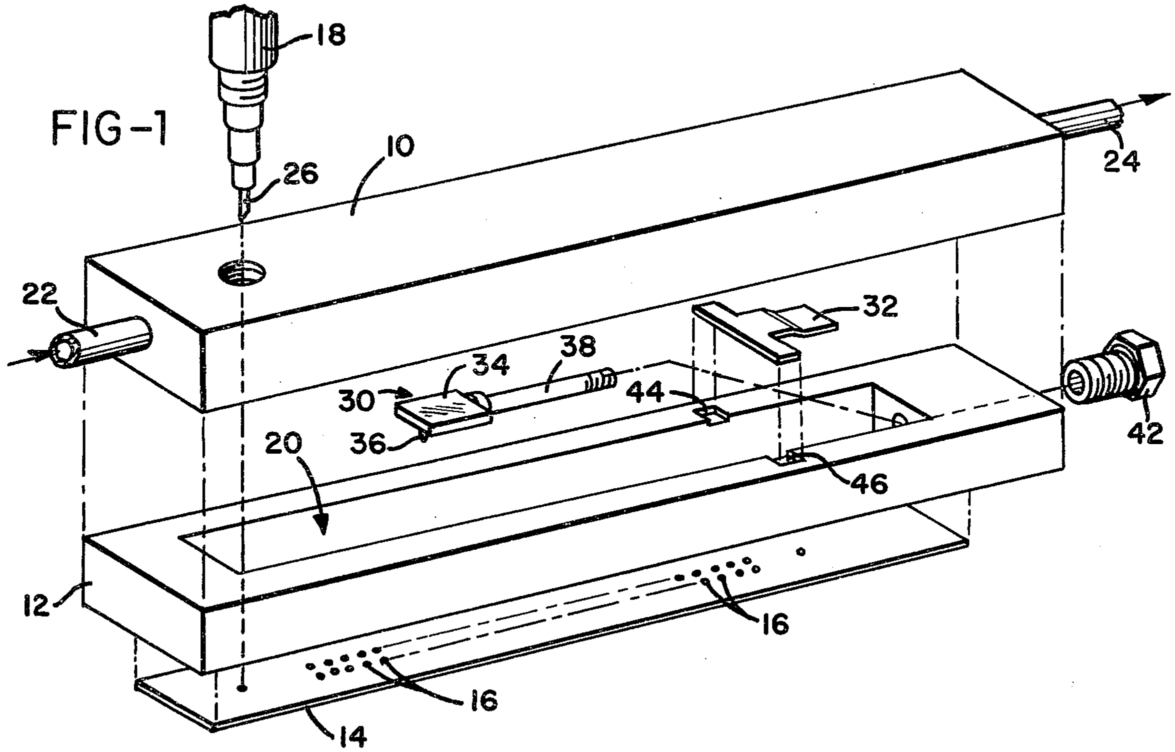
FIG. 1 is an expanded pictorial view of the printing head assembly of an ink jet printing device including the preferred embodiment of the damping means of the present invention.
Figure 2:
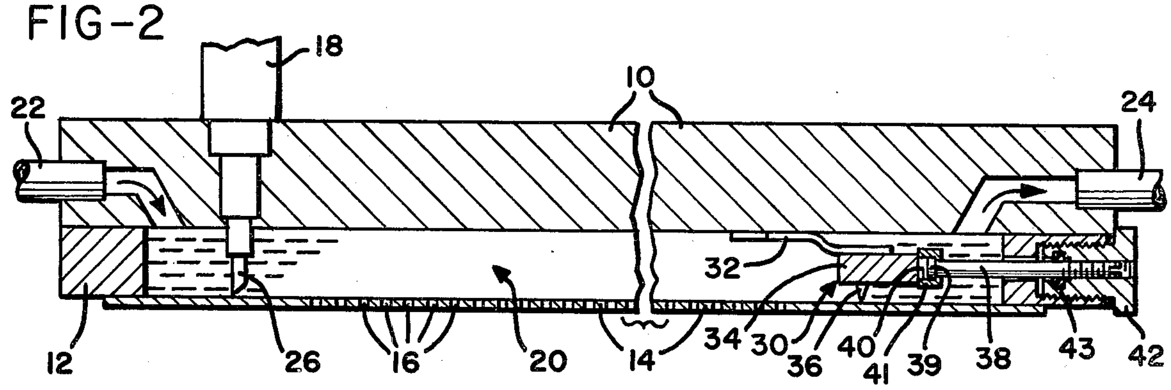
FIG. 2 is a longitudinal cross sectional view through the center of the device illustrated in FIG. 1, in the assembled condition.

The present invention is intended for use in a printing head for an ink jet printing device in which traveling wave stimulation is utilized to cause uniform formation of filaments and droplets from a plurality of orifices extending in a row or rows along the length of the orifice plate. The Lyon et al patent, referred to above, discloses one such device and the arrangement of the pertinent portions of the printing head of such a device are illustrated in FIG. 1 hereof. However, it is to be understood that substantial variations can be made in the general structure of the printing device and still incorporate the present invention.

The basic structure of such a printing head includes an ink supply manifold composed of upper and lower portions 10 and 12, an orifice plate 14 containing a plurality of orifices 16, and a stimulation device 18. In such devices, the reservoir 20 formed in the lower portion 12 of the ink supply manifold, has its lower edge portion in engagement with the upper surface of the orifice plate 14 and defines an active area on the orifice plate along which traveling waves propagate when generated by the stimulation device 18.

The orifice plate 14 is secured to the bottom portion of the manifold so that it will not vibrate except for that portion defined by the reservoir. The orifice plate 14 is usually secured to the ink supply manifold by soldering or epoxy, or it can even be bolted on by an additional frame member (not shown) if desired. Ink is supplied to the reservoir and thus the orifices 16, under pressure from input line 22. The flow of ink is usually greater than is necessary to supply ink to the orifices in order to maintain a constant pressure in the reservoir. The overflow of ink is thus passed through the outlet line 24 while the remainder of the ink passes through the orifices 16.

The stimulation device 18 can be of any desired type of electroacoustical transducer construction which can provide high frequency vertical movement of the tip portion 26 thereof. Tip portion 26 is in contact with the upper surface of orifice plate 14 at one end thereof and causes traveling wave vibrations along the length of the orifice plate 14.

The present invention involves incorporation in the above described general type of traveling wave stimulation printing head, of a damping means basically comprising a rigid contact member 30, which is adjustably positionable along the surface of orifice plate 14, and a resilient member 32 which urges the rigid contact member 30 into contact with the surface of orifice plate 14. Rigid contact member 30 has an outer end portion 34 of rectangular cross section with a lower dependent point 36 of conical configuration. The opposite end portion of rigid contact member 30 is in the form of a cylindrical shaft 38 which has its outer end threaded and a screw slot in the end thereof. In order to permit shaft 38 to be rotated independently of end portion 34 so as to keep point 36 in contact with the surface of the orifice plate during adjustment of the position of contact of point 36 longitudinally of the orifice plate, an enlarged cylindrical head 39 is formed on the end of shaft 38 and is held against a threaded cylindrical protrusion 40 extending from end portion 34. A threaded cap 41 has an inner shelf which holds head 39 and is screwed onto protrusion 40 to secure shaft 38 to end portion 34 while permitting relative rotation therebetween.

Shaft 38 is positioned in a horizontally extending hole cut through the side of the lower portion 12 of the ink manifold and extends through a plug member 42 threaded into the outer side of the lower portion 12 of the ink manifold. An O-ring 43 is held by plug member 42 in sealing engagement with a cylindrical shelf surrounding end portion 34 of the rigid contact member 30 and engages the shaft 38 so as to prevent leakage of ink from the reservoir. end portion 34 of contact member 30 when the resilient member 32 is positioned in recesses 44 and 46 on each side of the lower portion 12 of the ink manifold. Recesses 44 and 46 are approximately the depth of the thickness of member 32 so that when the upper and lower portions 10 and 12 of the ink manifold are secured together, member 32 is held securely in position by the bottom surface of upper portion 10 engaging the top surface of the portion of the T-shaped member setting in the recesses 44 and 46.

Figure 3:
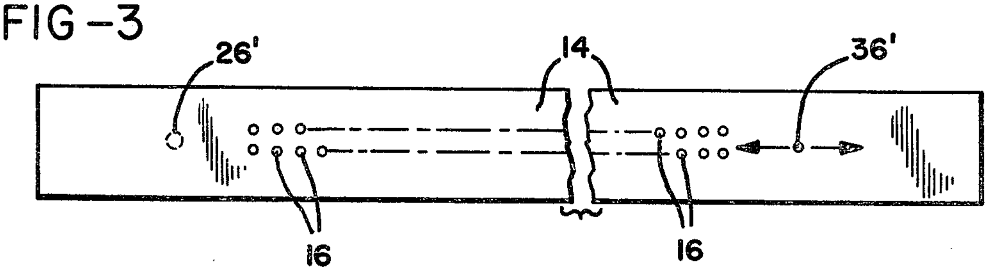
FIG. 3 is a schematic representation of a top plan view of the orifice plate, illustrating the position of the stimulator and the damping means of the present invention.

The rigid contact member 30 is so disposed in the reservoir 20 that it will contact the upper surface of orifice plate 14 at a position equidistant from the side edges thereof, as seen in FIG. 3. The area 26′ on FIG. 3 represents the point of contact of tip 26 of stimulation device 18 and the area 36′ represents the point of contact of the conical point 36. Point 36 can be moved in the direction of the arrows on FIG. 3 by rotating shaft 38 as described above.

In operation, when stimulation device 18 is operated at the desired frequency it will cause a series of vibrational waves to travel along the orifice plate from the tip 26 of the stimulation device to the end of the active area of the orifice plate remote from the tip 26. Ideally, assuming that there is no interferring wave motion being reflected back towards the stimulation device from the opposite end of the orifice plate a standing pattern of wave motion will develop in the movement of the orifice plate which will result in generation of filaments of uniform length and uniformly spaced and sized droplets coming from the orifices 16. However, as a practical matter, there is substantial interference with this standing wave pattern due to the interferring waves which are reflected back towards the stimulation device 18.

By inserting the device of the present invention in the printing head and positioning the point 36 at an antinode of the standing wave pattern adjacent the end of the orifice plate where the interferring reflected waves are generated, a further wave pattern will be set up. However, this wave pattern is 180° out of phase with the interferring wave pattern and thus essentially cancels out the interferring wave motion so that over that portion of the orifice plate containing the orifices, a uniform standing wave pattern will be developed.

As noted above, since the position of the antinodes of the standing waves in the orifice plate will vary with a change in frequency of vibration, it is necessary to adjust the position of contact of point 36 longitudinally of the orifice plate. This is accomplished by turning the shaft 38 by inserting a screw driver in the slotted end thereof from outside the manifold. This causes the end portion 34 to move longitudinally in either direction along the surface of the orifice plate so as to move the position of point 36 to the location of an antinode in the standing wave pattern.

Adjustment of the position of point 36 can be accomplished during operation of the printing device since the adjustment screw is accessable from outside the manifold. The location of point 36 relative to the end of the active area of the orifice plate is important since the closer to the end of the active area that the point is located the fewer half-wavelengths are available to accumulate phase error and thus dampen out the reflected waves. The point should therefore be positioned several wavelengths of the operating frequency of vibration, from the end of the active area defined by the end wall of the reservoir.

It is to be noted that although the above described invention is illustrated in connection with an orifice plate which is stimulated from one end, it is also contemplated that the orifice plate could be stimulated in the center as disclosed in Stoneburner U.S. Pat. No. 3,882,508, and a device constructed in accordance with the invention could then be positioned at each end of the orifice plate to produce the same effect. Also, although the preferred embodiment is illustrated as being positioned within the reservoir, it is contemplated that with some constructions it would be advantageous to position the device outside of the reservoir in contact with the underside of the orifice plate.

While the form of apparatus herein described constitutes a preferred embodiment of this invention, it is to be understood that the invention is not limited to this precise form of apparatus, and that changes may be made therein without departing from the scope of the invention.

What is claimed is:

1. In an ink jet printing device having a printing head with an elongated orifice plate containing a plurality of orifices along its length and a stimulation means for generating high frequency traveling wave vibration longitudinally of the orifice plate, the improvement comprising:

damping means disposed remote from said stimulation means along said orifice plate and having an adjustably positionable rigid contact member in engagement with the surface of said orifice plate for engaging said orifice plate at a position such that reflected vibrations from an end of said orifice plate will be substantially damped.

2. A device as defined in claim 1 wherein said rigid contact member is in substantially point contact with said orifice plate at a position equidistant from the side edges of said orifice plate.

3. A device as defined in claim 2 wherein said damping means further includes means resiliently urging said rigid contact member into engagement with said orifice plate.

4. A device as defined in claim 3 wherein said rigid contact member engages the surface of said orifice plate from which ink is supplied to said orifices.

5. A device as defined in claim 4 wherein said rigid contact member is adjustably positionable longitudinally of said orifice plate.

6. A method of damping interfering wave motion in an elongated orifice plate of an ink jet printing device which utilizes traveling wave motion in the orifice plate to generate uniform filaments and droplets from a plurality of orifices defined in the orifice plate along its length, the step comprising:

applying a constant force at substantially a point location remote from a position of contact with said orifice plate by a means for generating said traveling waves, and equidistant from side edges of said elongated orifice plate.

* * * * *